March 18, 1958     E. W. KREBS     2,827,582
HETEROPOLAR INDUCTOR MACHINES

Filed Sept. 24, 1956     2 Sheets-Sheet 1

Inventor
Ernst Wolfgang Krebs
By
Bailey, Stephens & Huettig
Attorneys

March 18, 1958    E. W. KREBS    2,827,582
HETEROPOLAR INDUCTOR MACHINES
Filed Sept. 24, 1956    2 Sheets-Sheet 2

*Inventor*
Ernst Wolfgang Krebs
By
Bailey Stephens & Sutton
*Attorneys*

United States Patent Office 2,827,582
Patented Mar. 18, 1958

2,827,582

HETEROPOLAR INDUCTOR MACHINES

Ernst Wolfgang Krebs, Purley, England

Application September 24, 1956, Serial No. 611,637

Claims priority, application Great Britain September 28, 1955

13 Claims. (Cl. 310—168)

This invention relates to heteropolar inductor machines of the type having salient poles, and is concerned with providing an improved machine of this type which shall be suitable for single phase and for polyphase operation alike, and for a wide frequency range of the order of 100 to 50,000 cycles per second, and for any number of rotor slots equal or greater than the number of poles.

According to the present invention, a heteropolar inductor machine including an unwound laminated rotor of magnetic material having open slots which are equally spaced around its circumference, and including a stator having an alternating-current winding and an even number of direct-current excited laminated salient poles which are of alternate polarity around the circumference of the stator-rotor air gap and whose effective overall air gap arc, covered by each pole face and measured between the outside limits of the pole face, is equal to one rotor slot pitch or a multiple thereof, is characterised in that there are in each pole two slots which carry the coil sides of the alternating-current winding and which each have an opening towards the pole face, said openings dividing the pole face into a centre portion and two outer portions so that the sum of the air gap arcs for the outer portions substantially equals the arc for the centre portion, and each pole face being arranged to inter-act with the rotor slots in such a manner that as the rotor is rotated relatively to the stator through successive circumferential distances each equal to one rotor slot pitch, the total air gap reluctance associated with the whole pole face will remain substantially constant but the air gap reluctances respectively associated with the centre portion and both outer portions of the pole face will vary cyclicly, respectively in opposite senses, through successive complete cycles.

Preferably all poles are of identical shape and the two slots in each pole are arranged symmetrically to the centre line of the pole in a circumferential direction. The width at the pole face of the slot openings is either small in comparison with the rotor slot pitch or, if the rotor slot pitch itself is small, it may be equal to the rotor slot pitch or a multiple thereof. The two coil sides lying in the two slots of the same pole preferably form one coil of the alternating-current winding, resulting in the shortest possible end windings and in complete avoidance of crossing-over the end windings of individual coils of both the alternating-current winding and the direct-current excitation winding.

Each complete pole may be regarded as a separate magnet having a centre tooth, which is surrounded by the alternating-current coil, and two outer teeth, the total flux in the pole remaining more or less constant whilst the partial fluxes swing cyclicly from the centre tooth to both outer teeth as the rotor moves through half a rotor slot pitch. This swinging partial flux induces in the alternating-current coil an alternating E. M. F. in the same way as the alternating flux does in a shell type transformer. The phase position of the E. M. F. at a given instant corresponds to the position of the centre tooth relative to a rotor slot at that instant. A similar situation exists at each other pole and, if the number of rotor slots is not a multiple of the number of pairs of poles and the poles are equally spaced around the circumference, it is clear that there will be a phase shift between the voltages induced at adjacent poles and that the phase angle between the voltage induced at one pole and that of the next pole will be the same all around the stator. In other words, the voltages in all coils represent then a balanced polyphase system, but they are reduced to a single phase system if the number of the rotor slots is a multiple of the number of pairs of poles. In addition, it will be clear that there will be an additional phase difference of 180° between the voltages induced at poles of opposite polarity. Further additional phase shift of the voltages induced at different poles can be obtained by departing from the above-mentioned condition that the poles are of identical shape and equally spaced around the circumference, and that the alternating-current slots are arranged symmetrically to the pole centre.

In one convenient construction according to the invention, each pole face covers an overall arc equal to $(2n+1)$ times the rotor slot pitch, where $n$ is an integer greater than or equal to zero and where $(2n+1)$ is less than the ratio of the number of rotor slots to the number of poles. The gap between adjacent pole arcs should preferably be equal or smaller than twice the rotor slot pitch.

Furthermore, when the pole arc is greater than one rotor slot pitch, each pole face may be formed with a number of open slots arranged symmetrically on either side of the two slots in the pole, these open stator slots being of the same or similar width as the rotor slots and being so arranged that at successive positions of the rotor each of the stator slots in the centre portion of the pole face is substantially opposite a rotor slot when each of the stator slots in the outer portions of the pole face lies substantially between two rotor slots. The outermost open slots in each pole face may in certain cases fall on the outside limits of the pole face as previously defined. In such cases the actual pole arc from one edge of the pole to the other may be shorter than a multiple of the rotor slot pitch, though the effective pole arc will still comply with the rules stated above.

The fact that in a machine according to the invention the effective overall arc of each pole face corresponds to one complete rotor slot pitch or a multiple thereof enables the requirement, that the total air gap reluctance at each individual pole should remain substantially constant, to be satisfied. Thus one cause of the appearance of induced voltages in the field windings due to total flux variations in each pole can be reduced or eliminated.

The alternating-current coils may be connected together in any manner known for polyphase or single phase machines of this kind. For example, all even harmonics may be suppressed in the terminal voltage by connecting in series coils associated with poles whose instantaneous position relative to the rotor slots differs by half a rotor slot pitch. Similarly, the third harmonic and its multiples may be suppressed in the terminal voltage by connecting in series coils associated with poles whose instantaneous position relative to the rotor slots differs by a third of a slot pitch and so forth.

Preferably a damping winding is also provided tending to hold the total flux in each pole constant, and this may be in the form of short-circuited turns of low impedance around each pole body or around the stator yoke between adjacent poles, or of low-impedance conductors extending parallel to the rotor axis between the adjacent edges of adjacent pole faces and linked at their ends by short-circuited rings. These assist in avoiding or reducing induced alternating-current voltages in the field windings, due for example to flux variations in the individual poles caused by the alternating current flowing in the conductors in the two pole slots. They also increase the short-circuit current and thus increase the output of the machine. If a solid magnetic yoke is used in the stator, as may be preferable for large machines or if magnetically orientated laminated material is used for the poles to reduce losses, an effective damping is already produced by the eddy currents in the yoke.

Instead of using a separate damping winding, the total flux per pole can be held constant by arranging parallel circuits in the excitation winding, provided the number of rotor slots is not a multiple of the number of poles. For this purpose all coils of the excitation winding may be connected in parallel, or all coils of the excitation winding associated with the north poles may be paralleled and those associated with the south poles may be paralleled and these two groups of coils connected in series. Again, the field coils associated with poles having the same instantaneous position relative to the rotor slots may be connected in series, these series-connected groups of coils being connected together in parallel.

In practice it is preferable to restrict the number of parallel circuits to two or three, dependent on the phase shift between adjacent poles. The damping by the parallel circuits in the excitation winding of any alternating flux is extremely effective even at high frequencies, owing to the relatively fine wire, which avoids eddy currents, and the large amount of winding copper available in comparison with that for a separate damping winding.

The invention may be carried into practice in various ways, but certain specific embodiments will now be described by way of example with reference to the accompanying drawings, in which Figure 1 is a cross-section of a single phase four pole inductor alternator, having 6 open rotor slots;

Figure 4:
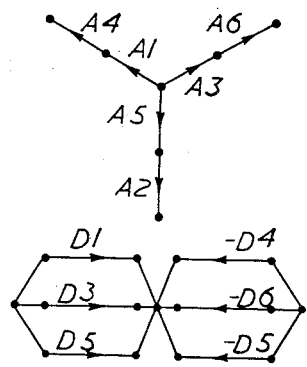
Figure 4 is a schematic diagram indicating the connections of the windings for the machine of Figure 3 for a three-phase output and for producing a damping effect by the field winding.
Figure 5:
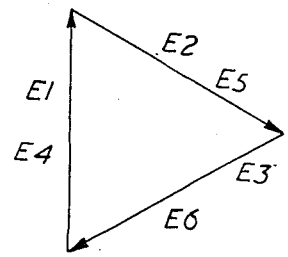
Figure 6:
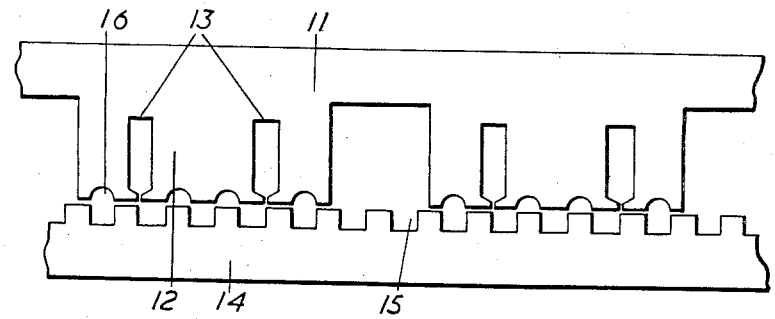
Figure 7:
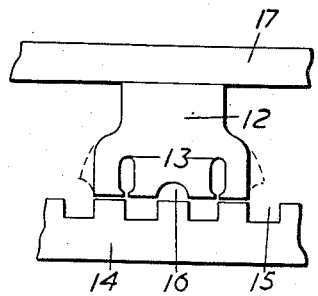

Figure 5 is a vector diagram of the E. M. F.'s induced in the field coils of Figure 4;

Figure 6 is a developed cross-section of two adjacent poles for a modified form of an inductor machine, having 7 open rotor slots per pole and 4 corresponding unwound slots in the face of each pole, and Figure 7 is a developed cross-section of a modified form of pole, having a pole arc of 2½ rotor slot pitches.

Figure 1:
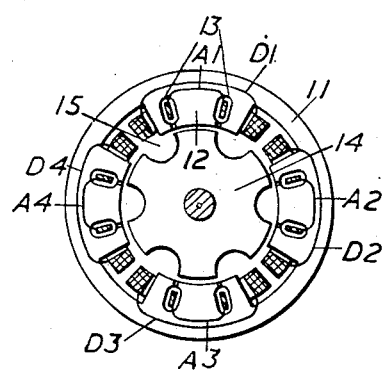

The machine illustrated in Figure 1 has six equidistant and unwound open rotor slots and is suitable for generating a single phase output of 300 cycles per second when driven at 3000 revolutions per minute. The machine has a laminated stator core 11 provided with four salient poles 12 of identical shape, spaced 90° apart around the axis. Each salient pole has two semi-closed slots 13 arranged symmetrically with respect to the centre of the pole, both slots 13 having a narrow opening into the tunnel of the stator core. These openings divide the pole face into a centre portion and two outer portions so that the sum of the air gap arcs for the two outer portions equals the arc for the centre portion. Alternate poles 12 around the axis are of opposite polarity, the excitation of the poles being provided by four direct-current excited field coils D1, D2, D3 and D4. Each of the field coils D1 to D4 surrounds one pole 12.

The slots 13 provided in the poles 12 are used to carry the four alternating-current coils A1, A2, A3 and A4. Each of the alternating-current coils A1 to A4 surrounds the centre portion of one pole so that the alternating-current coils A1 to A4 and the field coils D1 to D4 lie concentrically to one another and, as a consequence, no coil crosses another.

The rotor core, which is also laminated, is indicated at 14 and, as mentioned above, it has six semi-circular open slots 15 equally spaced around its circumference. The pole arc of each stator pole, i. e. the overall arc occupied by the face of the pole at the air gap, is very nearly equal to the rotor slot pitch, so that the total reluctance of the air gap at each pole, and hence the total pole flux, remains practically constant as the rotor turns. On the other hand, there is a great variation in the reluctance and the magnetic flux across the centre portion and the combined two outer portions of each pole face as the rotor turns, since first a rotor slot and then an unslotted portion of the rotor move in turn and in counter-phase opposite the respective portions of one pole face. The greatest interaction between the rotor slots and the respective portions of the pole face is obtained if the rotor slots are each a little wider than half the rotor slot pitch, and if the air gap between the stator and rotor core is as small as practicable.

Figure 2:
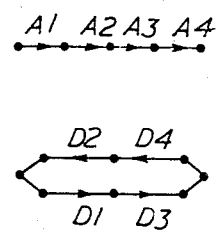
Figure 2 is a schematic diagram indicating the connections of the windings for the alternator of Figure 1.

The stator coils may be interconnected as shown diagrammatically in Figure 2. The alternating-current coils A1 to A4 are connected in series. The field coils D1 to D4 are connected to two parallel circuits with alternate coils D1 and D3 forming one circuit, the remaining coils D2 and D4 forming the other circuit and being reversed with respect to the former pair of coils, so as to produce opposite polarity in adjacent poles. Since two poles of opposite polarity face at a given instant a rotor tooth and a rotor slot respectively, the voltages induced in corresponding alternating-current coils, for example in A1 and A2, are in phase for the fundamental and the odd harmonics, but in phase opposition for all the even harmonics. Thus by the series connection of the odd-numbered coils A1 and A3 with the same number of even-numbered coils A2 and A4 all the even harmonics cancel each other out and are completely suppressed in the terminal voltage.

The object of the parallel circuits in the field winding of Figure 2 which is of low impedance is to provide a damping of the flux variations in a complete pole, whether it be produced by the variations of air gap reluctance or by the alternating-current in the coils A1 to A4. The effect of the damping is a further improvement of the wave form of the alternating-current voltage and an increase of the short-circuit current and thus of the output of the machine.

Figure 3:
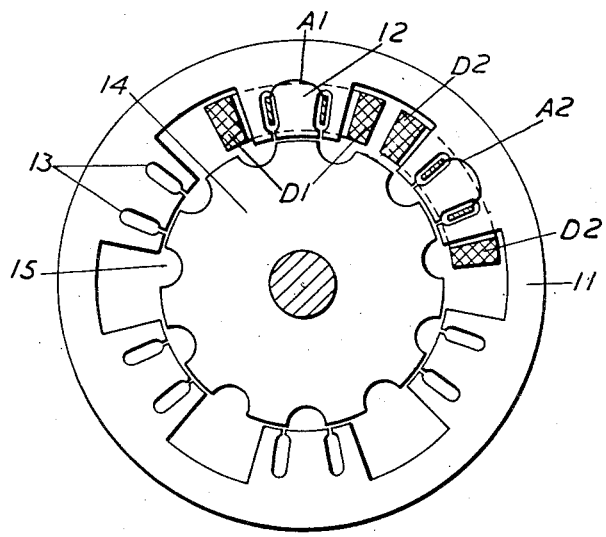
Figure 3 is a cross-section of a six pole inductor machine, having 11 open rotor slots.

In the example just described the number of rotor slots is a multiple of the number of pairs of poles in the stator. As a consequence, the voltages in the alternating-current coils are in phase (or in certain cases in phase opposition) and the output voltage is single phase. Conversely, if the number of rotor slots is not a multiple of the number of pairs of poles in the stator, there is a phase shift between the voltages in the alternating-current coils and polyphase output can be obtained. An example of this type is illustrated in Figure 3 for a six pole machine, which is suitable for three or single phase operation, both as an alternator or as a motor. Each of the six equally spaced poles 12 of the stator core 11 has two semi-closed slots 13 symmetrically arranged to the pole centre and the pole arc is again equal to one rotor slot pitch. The rotor core 14 has again equidistant semi-circular slots 15 whose number is in this instance eleven to render the machine suitable for generating a frequency of 550 cycles per second when running at 3000 revolutions per minute. Each pole carries in its slots 13 one of the alternating-current coils A1 to A6, and is surrounded by one of the direct-current excited field coils D1 to D6 (only A1, A2 and D1, D2 being shown in Figure 3).

For a three-phase output the stator coils are interconnected as shown diagrammatically in Figure 4. The alternating-current coils A1 to A6 are arranged as a star connection of pairs of coils, each pair comprising in series two coils which are mechanically 180° apart on the stator under poles of opposite polarity and which together represent one phase, for example A1 and A4. The field coils D1 to D6 are connected to two groups, each group comprising in parallel three alternate coils and the group containing the odd-numbered coils D1, D3 and D5 in reverse series with respect to the group containing the even-numbered coils D2, D4 and D6, to produce opposite polarity under adjacent poles.

All even harmonics in the output voltage are again cancelled out by the series connection of the two coils in each phase as in the previous example and the third harmonic is also eliminated by the star connection of the phases. The lowest remaining harmonics in the voltage wave are therefore the fifth and seventh, which can be counteracted by a relative skew between stator and rotor of $\frac{1}{6}$ of one rotor slot pitch.

Figure 5 is a vector diagram for the alternating-current voltages E1 to E6 induced in the field coils D1 to D6 of Figure 3, whereby the numbering of the voltages corresponds to that of the coils, for example E1 is induced in D1. The three alternating-current voltages induced in each group of parallel coils of Figure 4 constitutes a balanced three phase system which is short-circuited by the parallel connection and thus results in a very effective damping of any variation of the magnetic flux in each complete pole.

If the machine of Figure 3 is required to be used as a single phase alternator, the connections shown in Figure 4 may be used, with only two of the three out terminals being connected to the external load. As an alternative (not shown), all alternating-current coils may be connected in series, the coils A2 and A5 being reversed with respect to the remaining coils A1, A2, A4 and A6. The same machine can also be used as a low-speed synchronous motor if fed from an alternating-current supply and simultaneously excited with direct-current.

The embodiment illustrated in Figure 6 for two adjacent poles is in general the same as in the example of Figure 1, but in order to render the machine suitable for generating a much higher frequency, a much larger number of rotor slots 15 is provided, whilst the face of each stator pole 12 is itself provided with a number of open slots 16. Thus the number of rectangular open slots 15 in the rotor core 14 is in this case seven per pole giving an output frequency of 1400 cycles per second for a four pole machine running at 3000 revolutions per minute. The ratio of the overall arc of each pole face of the stator 11 to the rotor slot pitch equals five, this being the greatest odd number which is smaller than the number of rotor slots per pole. The semi-closed slots 13 are again arranged symmetrically to the centre of the pole 12 and divide the pole face into the centre portion covering an arc of two and a half rotor slot pitches and the two outer portions covering each an arc of one and a quarter rotor slot pitches. Four open slots 16 are provided in each pole face, two in the centre portion and one each in the outer portions of the pole face, also symmetrically arranged on either side of the centre of the pole. All the slots 16 are of the same semi-circular shape and similar in width to the rotor slot 15, the two inner slots being one rotor slot pitch apart and the two outer slots being four rotor slot pitches apart. As a result of this spacing the stator and rotor slots 16 and 15 are in register in the outer portions of the pole face when they are wholly out of register in the centre portion of the same pole face. In this way an increased cyclic variation of reluctance and of flux is produced between the individual portions of each pole, whilst at the same time the air gap reluctance over the whole pole face remains substantially constant at a low value.

A further embodiment of a modified form of pole is illustrated in Figure 7, which differs from the example just described in that there is only one open slot 16 in the centre portion of the stator pole 12 and that the overall arc of the pole face equals two and a half rotor slot pitches. This apparent discrepancy from the rule given above, that the overall arc of the pole face should be equal to an integer number of rotor slot pitches, is brought about by the arrangement of the open slots 16 in the pole face of the stator. Since the centre portion between the semi-closed slots 13 of the pole face covers one and a half rotor slot pitches and has an open slot 16 in its centre, the outer portions of the pole face should each cover three quarters of a rotor slot pitch and have half a slot 16 at the pole edge, as indicated by the dotted lines in Figure 7. The pieces of the pole marked by the dotted lines have obviously very little effect upon the variations of the air gap reluctance as the rotor moves relatively to the pole and can therefore be left off. Though the actual arc from one edge of the pole to the other is in this case two and a half rotor slot pitches, its effective arc may be defined as being equal to three rotor slot pitches, and similarly for any other arrangements in which one of the open slots lies in the centre of the stator pole.

Another feature of the construction shown in Figure 7 is that the laminated pole 12 is fixed to a separate solid yoke 17 of magnetic material. This construction is particularly suited for large machines or if magnetically orientated material is used for the pole to reduce the iron losses, or it may be adopted to produce additional damping by the eddy currents in the solid material of the yoke.

I claim:

1. A heteropolar inductor machine including an unwound rotor of laminated magnetic material having open slots which are equally spaced around its circumference, and including a stator having an alternating-current winding and an even number of direct-current excited laminated salient poles which are of alternate polarity around the circumference of the stator rotor air gap and whose effective overall air gap arc, covered by each pole face and measured between the outside limits of the pole face, is equal to one rotor slot pitch or a multiple thereof, is characterised in that there are in each pole two slots which carry the coil sides of the alternating-current winding and which each have an opening towards the pole face, said openings dividing the pole face into a centre portion and two outer portions so that the sum of the air gap arcs for the two outer portions substantially equals the arc for the centre portion, and each pole face being arranged to interact with the rotor slots in such a manner that as the rotor is rotated relatively to the stator through successive circumferential distances each equal to one rotor slot pitch, the total air gap reluctance associated with the whole pole face will remain substantially constant but the air gap reluctances respectively associated with the centre portion and both outer portions of the pole face will vary cyclicly, respectively in opposite senses, through successive complete cycles.

2. An inductor machine as claimed in claim 1 in which all poles are of identical shape and the two slots in each pole are arranged symmetrically with respect to the centre line of the pole in a circumferential direction.

3. An inductor machine as claimed in claim 1 in which the rotor slot pitch is comparatively large and the width at the pole face of the opening of the two pole slots is small in comparison with the rotor slot pitch.

4. An inductor machine as claimed in claim 1 in which the rotor slot pitch is comparatively small and the width at the pole face of the opening of the pole slots is equal to the rotor slot pitch or a multiple thereof.

5. An inductor machine as claimed in claim 1 in which each pole face covers an overall arc equal to $(2n+1)$ times the rotor slot pitch, where $n$ is an integer greater than or equal to zero and where $(2n+1)$ is less than the ratio of the number of rotor slots to the number of poles.

6. An inductor machine as claimed in claim 1 in which each pole face is formed with a number of open slots arranged symmetrically on either side of the two pole slots, the said open slots being of the same or approximately the same width as the rotor slots and being so arranged that at successive positions of the rotor each of the open stator slots in the centre portion of the pole face is substantially opposite a rotor slot when each of the open stator slots in the outer portions of the pole face lies substantially between two rotor slots.

7. An inductor machine as claimed in claim 1 in which each alternating-current coil is formed by the two coil sides lying in the two slots of the same pole and is arranged concentrically with respect to the field coil on the same pole.

8. An inductor machine as claimed in claim 7, having a single phase or poly-phase alternating-current winding each phase of which comprises one or more pairs of coils associated with poles whose instantaneous position relative to the rotor slots differ by half a rotor slot pitch.

9. An inductor machine as claimed in claim 1 in which each salient pole is surrounded by a short-circuit damping winding of low impedance.

10. An inductor machine as claimed in claim 1 in which the excitation winding comprises a number of field coils so connected together as to form parallel circuits in the excitation winding.

11. An inductor machine as claimed in claim 10 in which all the field coils associated with north poles are connected together in parallel in a group, and all the field coils associated with south poles are connected together in parallel in a second group, the two groups being connected in series.

12. An inductor machine as claimed in claim 10 in which the field coils associated with poles having the same constellation relative to the rotor slots are connected together in series and in which these series connected groups of coils are connected in parallel.

13. An inductor machine as claimed in claim 10 in which all the field coils associated with north poles are connected together in series in one group, and all the field coils associated with south poles are connected together in series in a second group, the two groups being connected in parallel.

No references cited.